(12) United States Patent
Nakata

(10) Patent No.: US 7,056,025 B2
(45) Date of Patent: Jun. 6, 2006

(54) FOIL BEARING

(75) Inventor: Hidehiko Nakata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 10/815,937

(22) Filed: Apr. 2, 2004

(65) Prior Publication Data

US 2005/0013515 A1  Jan. 20, 2005

(30) Foreign Application Priority Data

Jul. 14, 2003  (JP)  ............................. 2003-273839

(51) Int. Cl.
*F16C 32/06* (2006.01)

(52) U.S. Cl. ....................... 384/103; 384/106

(58) Field of Classification Search ................. 384/103, 384/104, 106, 317, 321

See application file for complete search history.

(56) References Cited

U.S. PATENT DOCUMENTS

| 4,465,384 | A |   | 8/1984  | Heshmat et al. |
|-----------|---|---|---------|----------------|
| 4,818,123 | A |   | 4/1989  | Gu             |
| 5,885,004 | A | * | 3/1999  | Scharrer et al. ............ 384/103 |
| 6,071,013 | A | * | 6/2000  | Inaguma et al. ............ 384/103 |
| 6,158,893 | A | * | 12/2000 | Heshmat ..................... 384/106 |

* cited by examiner

*Primary Examiner*—Thomas R. Hannon
(74) *Attorney, Agent, or Firm*—Squire, Sanders & Dempsey LLP

(57) ABSTRACT

In a foil bearing comprising: a stationary mount member (2) surrounding an outer circumferential surface of a journal (4) of a rotating member via an annular gap (G); and a plurality of centripetal force producing foils (or bump foils) 7 arranged in the annular gap so as to oppose a substantially entire part of the outer circumferential surface of the journal, the stationary mount member is provided with a plurality of circumferentially arranged through-holes (8) at an axially middle portion thereof, and the centripetal force producing foils comprise members which are axially spaced apart from each other at a position where the through-holes are located.

6 Claims, 6 Drawing Sheets

ID
FOIL BEARING

TECHNICAL FIELD

The present invention relates to a foil bearing comprising a stationary mount member surrounding a journal of a rotating member via an annular gap and a foil assembly disposed in the gap to support the journal.

BACKGROUND OF THE INVENTION

It is conventionally known to use a foil bearing as a bearing for a shaft (or journal) that rotates at a high speed such as at tens of thousands rpm, in which the foil bearing comprises a plurality of foils (flexible membranes) for forming a bearing surface and supports the shaft by means of pressure of a fluid dragged in between the shaft and the foils as the shaft rotates. Such a foil bearing is disclosed in U.S. Pat. No. 4,465,384 issued to Heshmat et al., for example, in which a plurality of cooling air intake holes are formed in a sleeve (stationary mount member). Further, U.S. Pat. No. 4,818,123 issued to Gu has disclosed a foil bearing in which each foil is formed with a through-hole for allowing cooling air to flow therethrough from an outer peripheral surface to an inner peripheral surface of the foil.

Such foil bearings are being used in a wider industrial fields and it is desired to improve the durability of the foil bearing to allow a higher rotational speed and higher load. Even in the foil bearings disclosed in the above publications, it is still required to increase the cooling efficiency in order to achieve a higher rotational speed and durability in continuous operation because the frictional loss between the shaft and foils increases in proportion to the square of the rotational speed.

BRIEF SUMMARY OF THE INVENTION

In view of the above observations of the prior art, a primary object of the present invention is to provide a foil bearing which has an improved cooling efficiency to allow an operation at a higher rotational speed.

A second object of the present invention is to provide a foil bearing that can eliminate a dead zone in a cooling air flow, to thereby achieve uniform cooling of the foils all around the shaft.

In order to achieve such objects, the present invention provides a foil bearing, comprising: a stationary mount member (2) surrounding an outer circumferential surface of a journal (4) of a rotating member via an annular gap (G); and a plurality of centripetal force producing foils (e.g., bump foils 7) arranged in the annular gap so as to oppose a substantially entire part of the outer circumferential surface of the journal, wherein the stationary mount member is provided with a plurality of circumferentially arranged through-holes (8) at an axially middle portion thereof, and wherein the centripetal force producing foils comprise members which are axially spaced apart from each other at a position where the through-holes are located.

According to such a structure, fresh air supplied to the foils through the through-holes can effectively improve temperature characteristics of the foils at a given rotational speed, i.e., the thermal equilibrium temperature of the foils can be lowered at a given rotational speed. This can allow operation at a higher rotational speed and higher loads.

In one preferred embodiment, at least one of the through-holes extends obliquely with respect to a line perpendicular to a circumference of the stationary mount member. This can result in a smooth flow of air from the through-holes into the annular gap defined between the stationary mount member and the centripetal force producing foils.

In another preferred embodiment, the through-holes may comprise a pair of through-holes (8a, 8b) extending obliquely with respect to an axis of the stationary mount member and inclined in opposite directions from each other such that openings of the pair of through-holes on an inner surface of the stationary mount member are arranged side by side substantially in an axial direction. Alternatively, the through-holes may comprise through-holes (8c, 8d) which are inclined in opposite axial directions and arranged alternately in a circumferential direction. These structures can promote spreading of the air discharged from the through-holes, to thereby achieve more even cooling of the foils over an entire circumference.

Further, if a circumferentially extending groove (11) is formed in an inner surface of the stationary mount member at an approximately middle portion thereof, the groove will promote the air to spread over the entire surface and thus contribute to achieving uniform cooling of the foils throughout the entire circumference.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
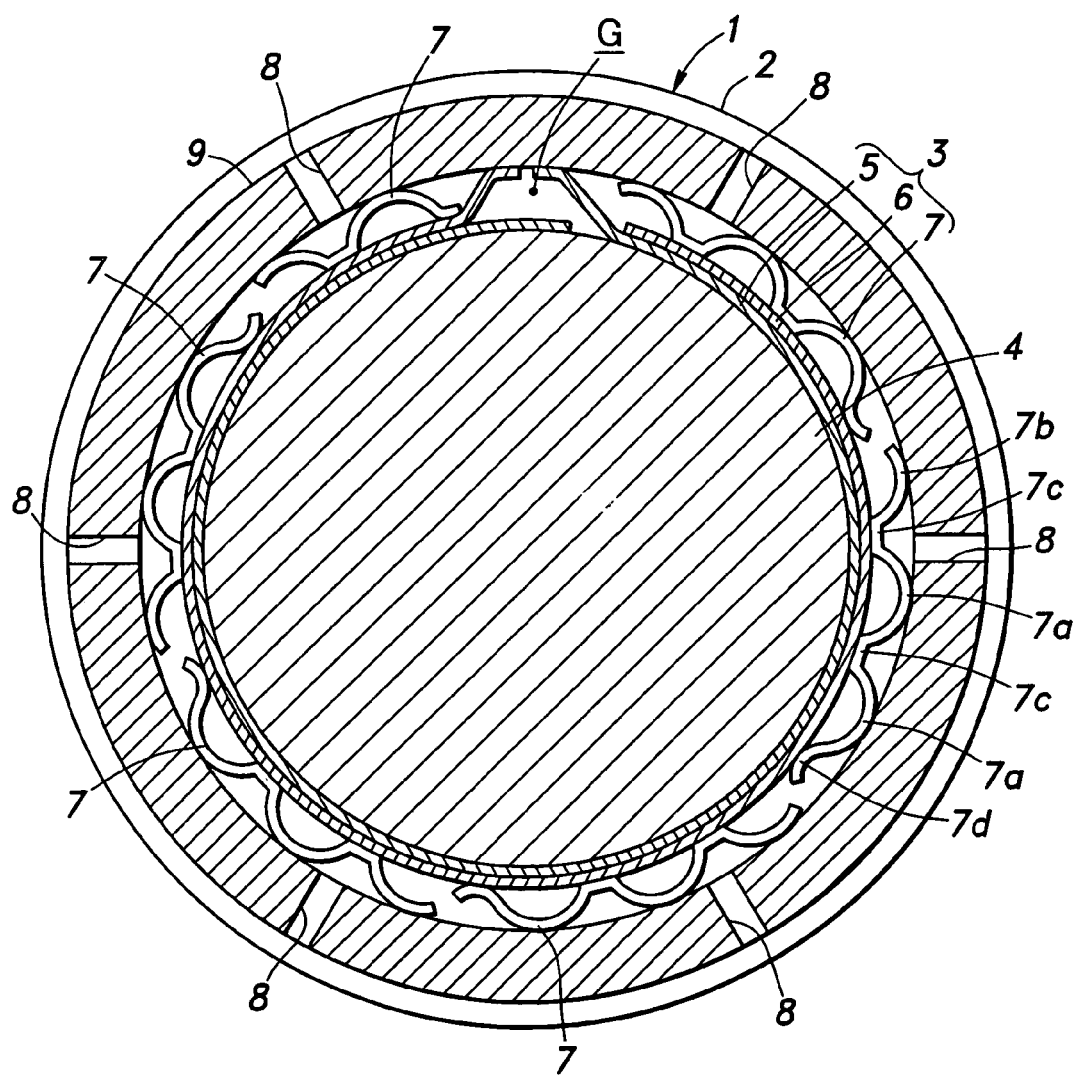
FIG. 1 is a side cross-sectional view of an embodiment of a foil bearing according to the present invention, where the cross-section is taken at an axially intermediate portion.
Figure 2:
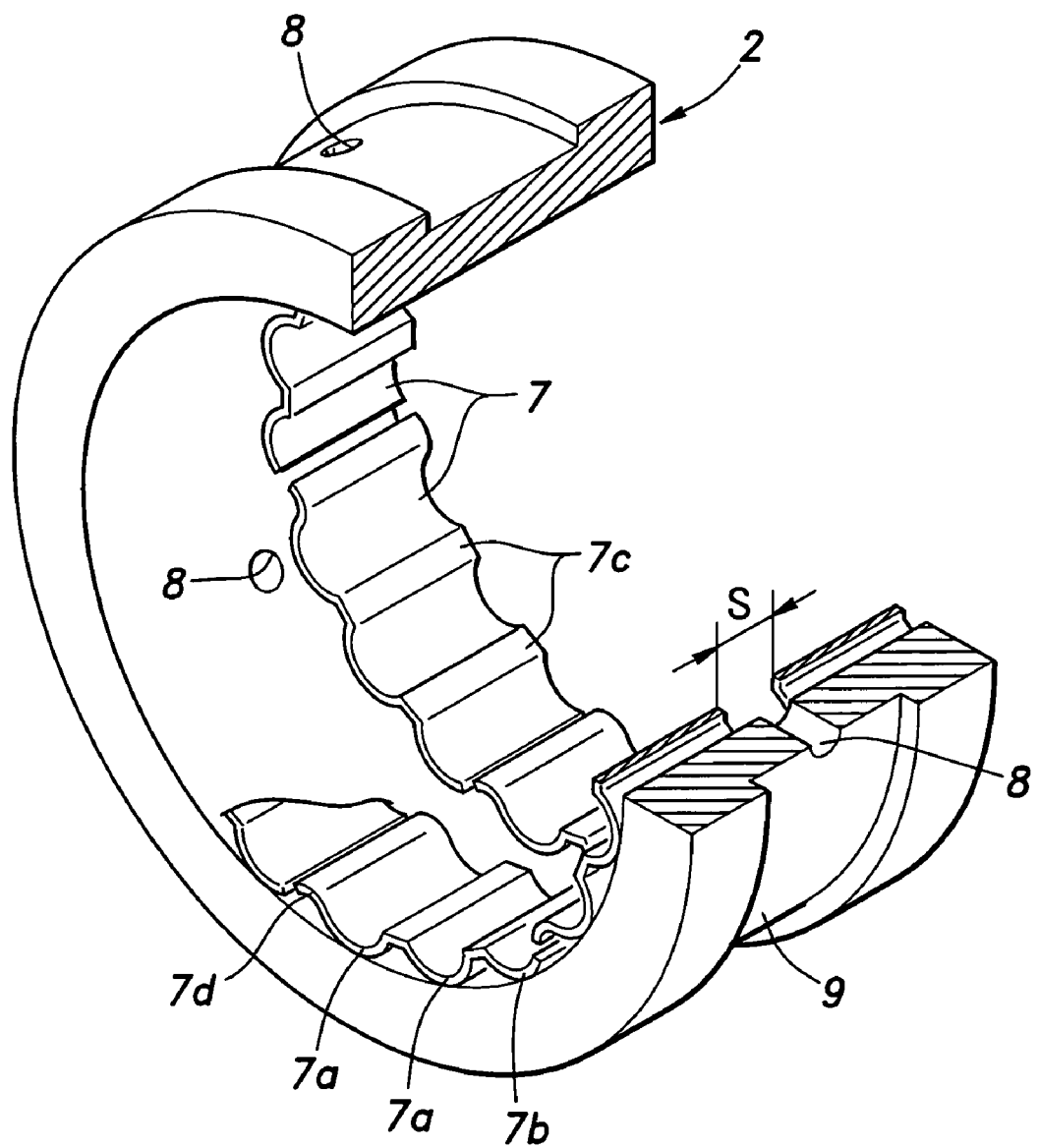
FIG. 2 is a perspective view of the foil bearing shown in FIG. 1 with part thereof being cut away.

FIGS. 1 and 2 show an embodiment of a foil bearing according to the present invention. In these drawings, in order to clearly show the relationship between various parts, the parts may not be shown in actual proportions.

This foil bearing 1 comprises a stationary mount member 2 having a cylindrical inner peripheral surface, and a foil assembly 3 attached to the inner peripheral surface of the stationary mount member 2. A journal 4 of a rotating member extends through the stationary mount member 2, wherein the journal 4 has a substantially circular cross-section when the cross-section is taken along the line perpendicular to an axial direction. An annular gap G is defined between the inner peripheral surface of the stationary mount member 2 and an outer peripheral surface of the journal 4, and the foil assembly 3 is disposed in the annular gap G.

The foil assembly 3 comprises a top foil 5, a middle foil 6 disposed outside of the top foil 5, and a plurality of bump foils 7 arranged outside of the middle foil 6.

The top foil 5 consists of a smooth sheet member curved in a substantially cylindrical shape, and one end thereof is welded to an upper part of the inner surface of the stationary mount member 2 while the other end thereof extends clockwise to wrap around the journal 4.

Like the top foil 5, the middle foil 6 also consists of a smooth sheet member curved in a substantially cylindrical shape, and one end thereof is welded to the inner surface of the stationary mount member 2 at a place adjacent to the welded end of the top foil 5. The other end of the middle foil 6 extends in a direction opposite to that in which the top foil 5 extends such that the middle foil 6 surrounds a substantially entire outer surface of the top foil 5.

The bump foils 7 each consist of a corrugated foil that comprises a series of circumferentially arranged arch-shaped portions 7a projecting in a radially outward direction. One end 7b of each bump foil 7 is welded to the inner peripheral surface of the stationary mount member 2, and the bump foils 7 are generally arranged circumferentially along the inner surface of the stationary mount member 2. In each bump foil 7, a top of each arch-shaped portion 7a slidably contacts the inner peripheral surface of the stationary mount member 2 while joint portions 7c connecting adjacent arch-shaped portions 7a and the other end 7d of the bump foil 7 slidably contact an outer peripheral surface of the middle foil 6 such that elastic deformation of the arch-shaped portions 7a generates a centripetal elastic force acting upon the journal 4.

As shown in FIG. 2, the bump foils 7 is each divided into two halves at an axially middle position such that the two halves are spaced apart from each other. Thus, the bump foils 7 comprise axially separated members which define therebetween a space S having a prescribed width and extending over the whole circumference.

In a portion of the stationary mount member corresponding to (or exposed by) the space S, a plurality of through-holes 8 are formed such that they are arranged substantially evenly (or with identical intervals) in the circumferential direction. Further, the outer peripheral surface of the stationary mount member 2 is formed with a circumferentially extending groove 9 having an appropriate width in the axial direction such that when the stationary mount member 2 is fitted in a bearing box (not shown), it is ensured that an annular room (not shown) surrounding the stationary mount member 2 is formed.

When the rotating member rotates at a high speed, air is supplied into the circumferential groove 9 (i.e., the annular room surrounding the stationary mount member 2), and is discharged from the through-holes 8. The discharged air flows axially along the inner surface of the arch-shaped portions 7a of the bump foils 7, to thereby favorably cool the bump foils 7 and middle foil 6.

Figure 3:
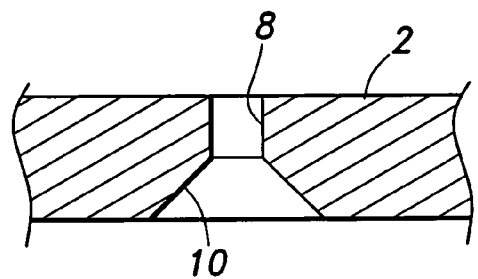
FIG. 3 is a partial front cross-sectional view showing a modified embodiment of the through-hole.

As shown in FIG. 3, an opening of each through-hole 8 on the side of the inner surface of the stationary mount member 2 may be preferably formed with a truncated conical surface 10 diverging toward the exit. This can effectively promote spreading of the air discharged from the through-holes 8.

Figure 4:
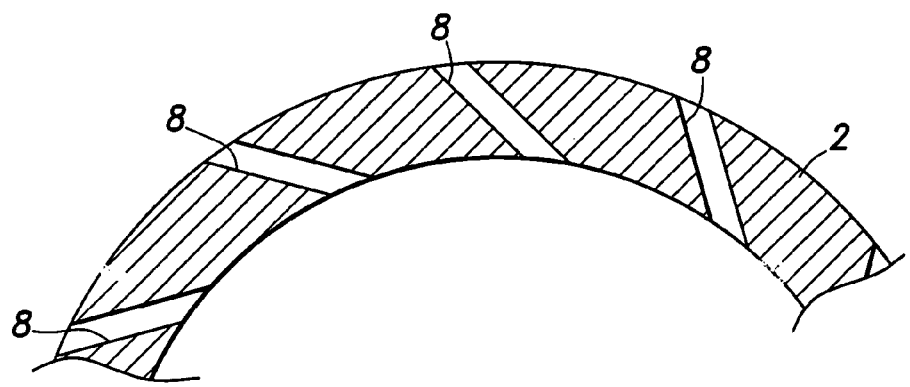
FIG. 4 is a partial side cross-sectional view showing another embodiment of the through-hole.

As shown in FIG. 4, the through-holes 8 may extend obliquely with respect to a line perpendicular to the circumferential surface of the stationary mount member 2. Such oblique through-holes 8 can result in a smooth flow of air into the annular gap G defined between the inner surface of the stationary mount member 2 and the outer surface of the middle foil 6, and thus enhance cooling of the foil assembly 3.

Figure 5:
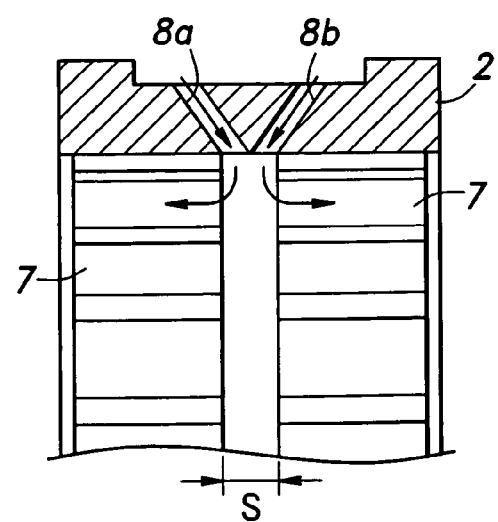
FIG. 5 is a partial front cross-sectional view showing yet another embodiment of the through-hole.

As shown in FIG. 5, each through-hole 8 may extend obliquely with respect to the center axis of the stationary mount member 2. In such a case, each through-hole 8 may preferably comprise a pair of through-holes 8a, 8b inclined in the opposite directions so that their openings on the inner surface of the stationary mount member 2 are arranged side by side and close to each other substantially in the axial direction. In this way, the airs discharged from the pair of through-holes 8a, 8b collide against each other, and this can promote spreading of the air over the foil assembly 3 whereby achieving more even cooling of the foil assembly 3 over the entire circumference thereof.

Figure 6:
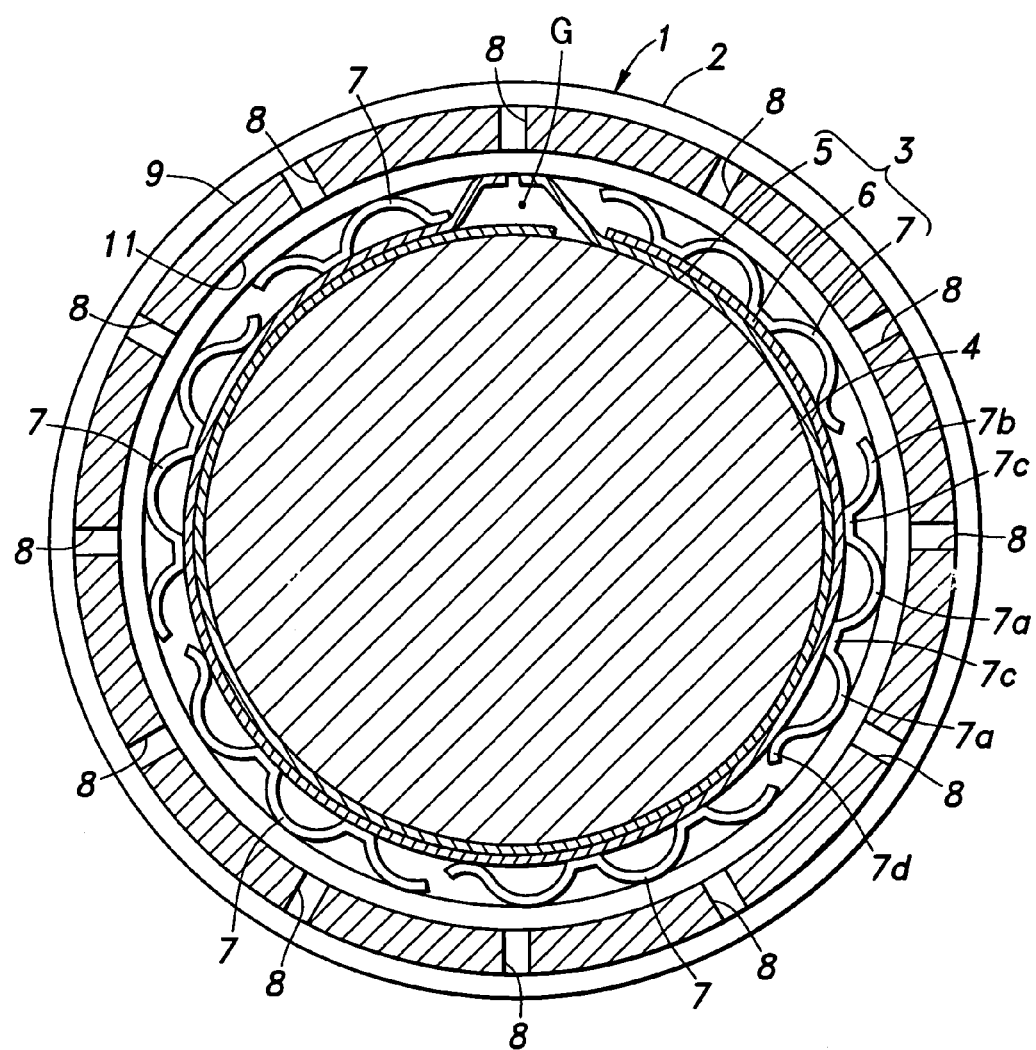
FIG. 6 is a side cross-sectional view of another embodiment of a foil bearing according to the present invention, where the cross-section is taken at an axially intermediate portion.
Figure 7:
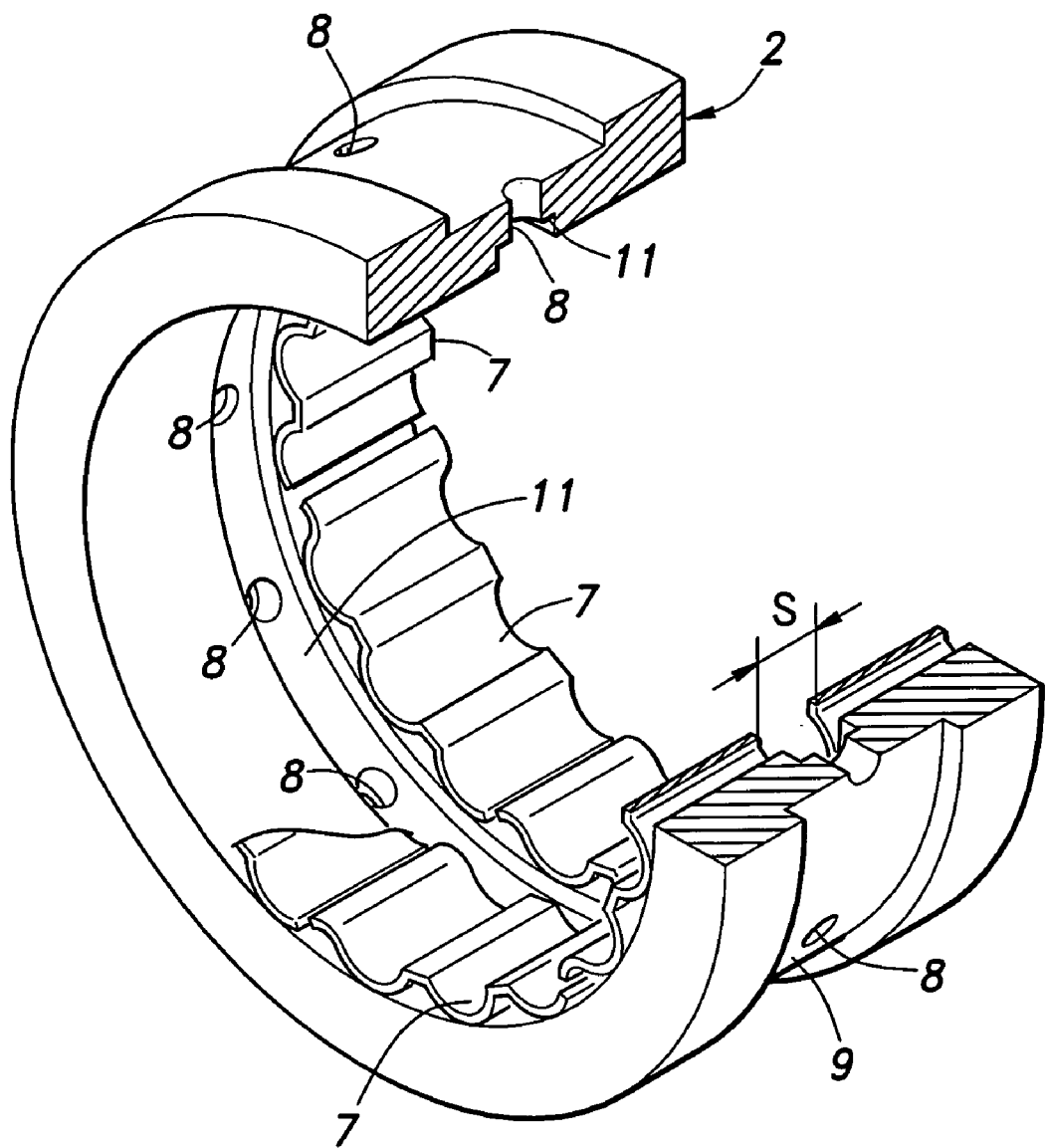
FIG. 7 is a perspective view of the foil bearing shown in FIG. 6 with part thereof being cut away.

FIGS. 6 and 7 show yet another embodiment of the present invention. In this embodiment, a circumferentially extending groove 11 having a rectangular cross-section is formed in an axially middle portion of the inner surface of the stationary mount member 2 so that the groove 11 is substantially aligned with the space S defined between the axially separated bump foils 7 and the through-holes 8 open in a bottom of the circumferential groove 11.

When air is supplied, the air is discharged from the through-holes 8 and hits against the outer surface of the middle foil 6 before spreading within the circumferential groove 11 to evenly cool the arch-shaped portions 7a of the bump foils 7. It should be noted that the flow of fresh air through the space between the bump foils 7 and middle foil 6 improves heat dissipation from the component parts that generate heat.

Preferably, the width of the circumferential groove 11 is substantially equal to or slightly smaller than that of the space S defined between the axially separated bump foils 7.

Figure 8:
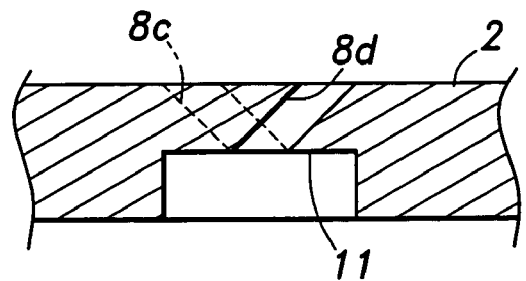
FIG. 8 is a partial front cross-sectional view showing yet another embodiment of the through-hole.

The through-holes 8 opening in the bottom of the circumferential groove 11 may be inclined as shown in FIGS. 4 and 5 in order to further enhance the spreading of air within the groove 11. Further, as shown in FIG. 8, the through-holes 8 may comprise through-holes 8c, 8d which are inclined in opposite axial directions and arranged alternately in the circumferential direction. According to this structure, air is discharged in the opposite directions from adjacent through-holes 8c, 8d, and this also contributes to the spreading of the cooling air.

Figure 9:
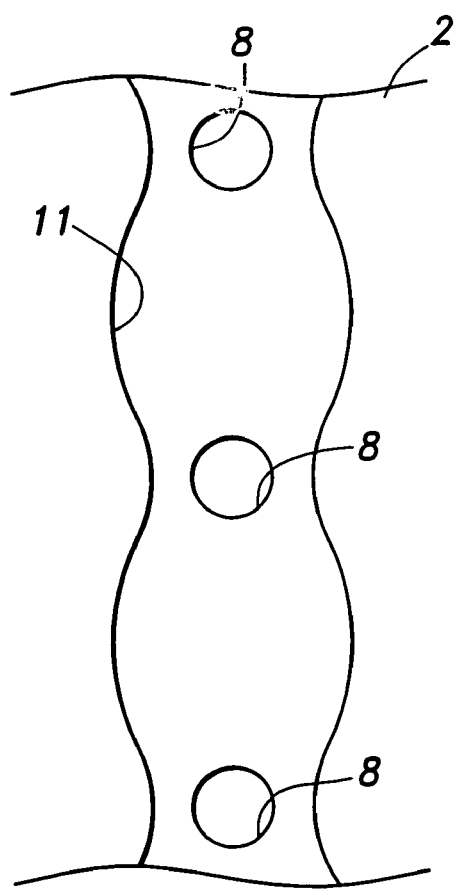
FIG. 9 is a partial developed view showing a modified embodiment of the annular groove.

The annular groove 11 may not necessarily have a constant width. For example, as shown in FIG. 9, part of the groove 11 at which the through-holes 8 are located may have a narrower width than the part between adjacent through-holes 8. This promotes the spreading of air discharged from the through-holes 8 into the groove 11 as well as makes the air flow rate unstable, to thereby achieve more uniform cooling of the bump foils 7.

It should be mentioned that the axial separation of the bump foils 7 increases the flexibility of each bump foil 7 and this effectively allows the bump foil 7 to produce adequate frictional damping force which preferably serves to suppress instability at high rotation speeds.

Although the present invention has been described in terms of preferred embodiments thereof, it will be obvious to a person skilled in the art that various alterations and modifications are possible without departing from the scope of the present invention which is set forth in the appended claims. For example, it may be possible to combine or change the structures shown in the embodiments in order to adapt the present invention to particular applications. As to the foil assembly, the number of sheet-shaped foil(s) or the shape of centripetal force producing foils are not limited to the above embodiments, and the present invention can be applied to other types of foils.

The foil bearing according to the present invention can be beneficially used in various applications as a bearing for supporting a rotating member to achieve steady rotation at high speeds and high durability under high loads.

The invention claimed is:

1. A foil bearing, comprising:
a stationary mount member surrounding an outer circumferential surface of a journal of a rotating member via an annular gap;
a plurality of centripetal force producing foils arranged in the annular gap so as to oppose a substantially entire part of the outer circumferential surface of the journal; and
a sheet-shaped foil placed between the outer circumferential surface of the journal and the plurality of the centripetal force producing foils and having one end secured to an inner side of the stationary mount member and the other end extending substantially in a cylindrical shape to wrap around the journal,
wherein the stationary mount member is provided with a plurality of circumferentially arranged through-holes at an axially middle portion thereof, and
wherein the centripetal force producing foils comprise members which are axially spaced apart from each other at a position where the through-holes are located whereby when the rotating member rotates, an air supplied through the through-holes of the stationary mount member flows through a space between the axially spaced-apart members of the centripetal force producing foils to hit against an outer surface of the sheet-shaped foil.

2. A foil bearing according to claim 1, wherein a circumferentially extending groove is formed in an inner surface of the stationary mount member at an approximately middle portion thereof.

3. A foil bearing comprising:
a stationary mount member surrounding an outer circumferential surface of a journal of a rotating member via an annular gap; and
a plurality of centripetal force producing foils arranged in the annular gap so as to oppose a substantially entire part of the outer circumferential surface of the journal,
wherein the stationary mount member is provided with a plurality of circumferentially arranged through-holes at an axially middle portion thereof,
wherein the centripetal force producing foils comprise members which are axially spaced apart from each other at a position where the through-holes are located, and
wherein at least one of the through-holes extends obliquely with respect to a line perpendicular to a circumference of the stationary mount member.

4. A foil bearing comprising:
a stationary mount member surrounding an outer circumferential surface of a journal of a rotating member via an annular gap; and
a plurality of centripetal force producing foils arranged in the annular gap so as to oppose a substantially entire part of the outer circumferential surface of the journal,
wherein the stationary mount member is provided with a plurality of circumferentially arranged through-holes at an axially middle portion thereof,
wherein the centripetal force producing foils comprise members which are axially spaced apart from each other at a position where the through-holes are located, and
wherein the through-holes comprise a pair of through-holes extending obliquely with respect to an axis of the stationary mount member and inclined in opposite directions from each other, openings of the pair of through-holes on an inner surface of the stationary mount member being arranged side by side substantially in an axial direction.

5. A foil bearing comprising:
a stationary mount member surrounding an outer circumferential surface of a journal of a rotating member via an annular gap; and
a plurality of centripetal force producing foils arranged in the annular gap so as to oppose a substantially entire part of the outer circumferential surface of the journal,
wherein the stationary mount member is provided with a plurality of circumferentially arranged through-holes at an axially middle portion thereof,
wherein the centripetal force producing foils comprise members which are axially spaced apart from each other at a position where the through-holes are located, and
wherein the through-holes comprise through-holes which are inclined in opposite axial directions and arranged alternately in a circumferential direction.

6. A foil bearing comprising:
a stationary mount member surrounding an outer circumferential surface of a journal of a rotating member via an annular gap; and
a plurality of centripetal force producing foils arranged in the annular gap so as to oppose a substantially entire part of the outer circumferential surface of the journal,
wherein the stationary mount member is provided with a plurality of circumferentially arranged through-holes at an axially middle portion thereof,
wherein the centripetal force producing foils comprise members which are axially spaced apart from each other at a position where the through-holes are located, and
wherein at least a portion of the through-holes extends in a direction that is not normal to the circumference of the stationary mount member.

* * * * *